US012046829B2

(12) United States Patent
Shahramian et al.

(10) Patent No.: US 12,046,829 B2
(45) Date of Patent: Jul. 23, 2024

(54) METHOD AND SYSTEM FOR SELF-ALIGNMENT OF SIGNALS IN LARGE-SCALE PHASED ARRAY SYSTEMS

(71) Applicant: NOKIA SOLUTIONS AND NETWORKS OY, Espoo (FI)

(72) Inventors: Shahriar Shahramian, Warren, NJ (US); Rosanah Murugesu, Warren, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 342 days.

(21) Appl. No.: 17/310,496

(22) PCT Filed: Feb. 12, 2019

(86) PCT No.: PCT/US2019/017728
§ 371 (c)(1),
(2) Date: Aug. 6, 2021

(87) PCT Pub. No.: WO2020/167300
PCT Pub. Date: Aug. 20, 2020

(65) Prior Publication Data

US 2022/0149518 A1 May 12, 2022

(51) Int. Cl.
*H01Q 3/26* (2006.01)

(52) U.S. Cl.
CPC .................................. *H01Q 3/267* (2013.01)

(58) Field of Classification Search
CPC ..................................................... H01Q 3/267
See application file for complete search history.

(56) References Cited

U.S. PATENT DOCUMENTS 10,009,165 B2 6/2018 Banu
2005/0219118 A1* 10/2005 Kubo .................... H01Q 3/267 342/174

(Continued)

FOREIGN PATENT DOCUMENTS

CN 103329004 A 9/2013
CN 103716080 A1 4/2014

(Continued)

OTHER PUBLICATIONS

Shahramian et al., "A fully integrated scalable W-band phased-array module with integrated antennas, self-alignment and self-test," 2018 IEEE International Solid—State Circuits Conference—(ISSCC), 2018, pp. 74-76.

(Continued)

*Primary Examiner* — Hoang V Nguyen
*Assistant Examiner* — Yonchan J Kim
(74) *Attorney, Agent, or Firm* — Chiesa Shahinian & Giantomasi PC

(57) ABSTRACT

A method and system are provided for aligning signals in a phased array system having multiple tiles. Tile-to-tile signal alignment is achieved through the use of internally-generated local oscillator signals and existing coupling paths between transmit and receive antenna elements in adjacent tiles of the phased array system. The relative phases of the local oscillator signals are measured in both directions between adjacent tiles to determine phase differences that can then be used for alignment of the signals between the adjacent tiles. The self-alignment process can then be repeated on subsequent adjacent tile pairs, thus providing a fully aligned and phase-balanced phased array system. Because there is no need for any external signals or components that are not already resident on the tiles, self-alignment can be performed as part of system startup, e.g., (Continued)

to align the multi-tile phased array before the system is placed into operation in a live network.

17 Claims, 9 Drawing Sheets

(56) References Cited

U.S. PATENT DOCUMENTS

| | | | | |
|---|---|---|---|---|
| 2011/0279147 | A1* | 11/2011 | Montalvo ......... | H04W 56/0035 327/3 |
| 2013/0293411 | A1 | 11/2013 | Dehlink et al. | |
| 2014/0241463 | A1 | 8/2014 | Leenaerts et al. | |
| 2016/0248451 | A1 | 8/2016 | Weissman et al. | |
| 2018/0115360 | A1 | 4/2018 | Niknejad et al. | |
| 2018/0159599 | A1 | 6/2018 | Sattinger et al. | |
| 2019/0372218 | A1* | 12/2019 | Vehovc .................. | H04B 17/12 |

FOREIGN PATENT DOCUMENTS

| | | | |
|---|---|---|---|
| CN | 108292929 | A | 7/2018 |
| WO | 2013063575 | A1 | 5/2013 |
| WO | 2017001013 | A1 | 1/2017 |

OTHER PUBLICATIONS

Buckwalter et al., "An Integrated Subharmonic Coupled-Oscillator Scheme for a 60-GHz Phased-Array Transmitter," 2006, IEEE Transactions on Microwave Theory and Techniques, vol. 54, No. 12, pp. 4271-4280.

Safaripour et al., "Dynamic Polarization Control of Two-Dimensional Integrated Phased Arrays," 2016 IEEE Transactions on Microwave Theory and Techniques, vol. 64, No. 4, pp. 1066-1077.

Buckwalter et al., "Quadrature Subharmonic Coupled Oscillators for a 60GHz SiGe Scalable Phased Array," 2006, IEEE MTT-S International Microwave Symposium Digest, 2006, pp. 822-825.

International Search Report and Written Opinion mailed Mar. 12, 2019, in connection with International Patent Application No. PCT/US2019/017728, filed Feb. 12, 2019, 11 pgs.

International Preliminary Report on Patentability mailed Aug. 10, 2021, in connection with International Patent Application No. PCT/US2019/017728, filed Feb. 12, 2019, 9 pgs.

First Office Action and Search Report mailed Dec. 7, 2023 in connection with Chinese Patent Application No. 201980091783.X, 23 pgs. (including translation).

* cited by examiner

METHOD AND SYSTEM FOR SELF-ALIGNMENT OF SIGNALS IN LARGE-SCALE PHASED ARRAY SYSTEMS

CROSS-REFERENCE TO RELATED APPLICATIONS

This application is a national stage under 35 U.S.C. 371 of International Patent Application No. PCT/US2019/017728, filed Feb. 12, 2019, the disclosure of which is incorporated herein by reference in its entirety.

TECHNICAL FIELD

The present invention relates generally to phased arrays, and more particularly to a method and system for the self-alignment of large-scale phased array systems.

BACKGROUND

Next-generation mobile technology, e.g., fifth generation (5G), demands ultra-low latency and high data-rates with ubiquitous deployment supporting multiple users through the use of small cells. Pico-cells, for example, typically may require up to hundreds of active elements capable of producing thousands of beam patterns. As such, highly integrated phased array systems are an essential building block for next-generation communication applications.

In manufacturing large-scale phased arrays, it is often preferable to avoid integrating all the elements of a system on a single chip because chip size can become too large and yield can be degraded. Accordingly, it is not uncommon to distribute system elements on various chips. However, distribution on multiple chips can have its own challenges and complexities, such as ensuring alignment of the various system elements to ensure proper response and signal integrity. In a distributed arrangement, "tiles" (e.g., cells) are typically organized in rows and columns, wherein one tile is electrically coupled to adjacent tiles, e.g., a previous and a next tile. Although elements within one tile are aligned with each other, elements between two adjacent tiles are not necessarily aligned, and thus require additional alignment processes to maintain signal integrity. In a large-scale phased array, the distribution of signals to all tiles needs to be phase balanced for beamforming purposes, which can be very complicated especially when distributing signals at high frequencies, e.g., 90 GHz millimeter-wave (mm-wave) signals using an array of 16 tiles or more on a printed circuit board (PCB).

SUMMARY

In accordance with various embodiments, a method and system are provided for aligning signals in a phased array system having multiple tiles. Tile-to-tile signal alignment is advantageously achieved through the use of internally-generated local oscillator signals and existing coupling paths between transmit and receive antenna elements in adjacent tiles of the phased array system. For example, existing antenna coupling paths are utilized to measure the relative phase of the local oscillator (LO) signals in both directions between adjacent tiles to determine phase differences that can then be used for alignment of the signals between the adjacent tiles. The self-alignment process can then be repeated on subsequent adjacent tile pairs, thus providing a fully aligned and phase-balanced phased array system. Because there is no need for any external signals or components that are not already resident on the tiles, self-alignment can be performed as part of system startup, e.g., to align the multi-tile phased array before the system is placed into operation in a live network.

In accordance with an embodiment, a first LO signal is transmitted from a transmitter in a first tile to a receiver in an adjacent second tile where the phase of the first LO signal is measured. In a similar manner, a second LO signal is transmitted in the opposite direction from the transmitter in the second tile and the phase of the second LO signal is measured at the receiver in the first tile. If the measured values indicate a phase difference, then actions can then be taken to remediate the phase difference, e.g., by changing the phase of one of the LO signals by an amount that is equal to the phase difference, thus obtaining signal alignment between adjacent tiles in the phased array. According to an embodiment, the phase of the respective local oscillator signals is swept to obtain multiple measurements. According to embodiments, the respective local oscillator signals are mixed with a constant DC voltage value to generate local oscillator-induced DC offset signals such that phase of the local oscillator signals can be measured with DC offset-cancellation circuitry at the baseband level.

According to an embodiment, a method for performing tile-to-tile alignment includes setting at least one of the baseband signal inputs at the transmitter to a constant value (e.g., a constant DC voltage value). The internally generated LO signal is generated from the first tile by applying an LO-induced DC offset to the transmit mixer of the first tile for up-conversion. The up-converted signal is received and down-converted at the adjacent second tile. When the LO signal from the first tile is received at the second tile, the LO signals down-convert into a DC value at the baseband block in the second tile. The DC value is then measured using the existing DC offset-cancellation circuit in the second tile and values for the received baseband signals are calculated. In an embodiment, the process is then repeated in the opposite direction, i.e., transmission from the second tile to the first tile, and the detected DC terms are used to measure the relative phases and to calculate phase difference to facilitate phase corrections for tile-to-tile alignment.

The self-aligning aspects of the described embodiments can be particularly beneficial for large-scale systems, such as those that are contemplated for use in next generation 5G networks.

DETAILED DESCRIPTION

Herein, the term "tile" is to be understood to refer to an element forming part in a distributed arrangement of a phased-array antenna system, wherein an individual tile comprises one or more transmitters and one or more receivers of radio frequency (RF) signals.

Various illustrative embodiments will now be described more fully with reference to the accompanying drawings in which some of the illustrative embodiments are shown. It should be understood, however, that there is no intent to limit illustrative embodiments to the particular forms disclosed, but on the contrary, illustrative embodiments are intended to cover all modifications, equivalents, and alternatives falling within the scope of the claims. Where appropriate, like numbers refer to like elements throughout the description of the figures. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of illustrative embodiments. As used herein, the term "and/or" includes any and all combinations of one or more of the associated listed items. The term 5G, as used herein, is meant to refer to the next generation (i.e., fifth generation) of mobile networks as specified by the International Telecommunications Union-Radiocommunication Sector (ITU-R), which is well known to those of ordinary skill in the art.

Figure 1:
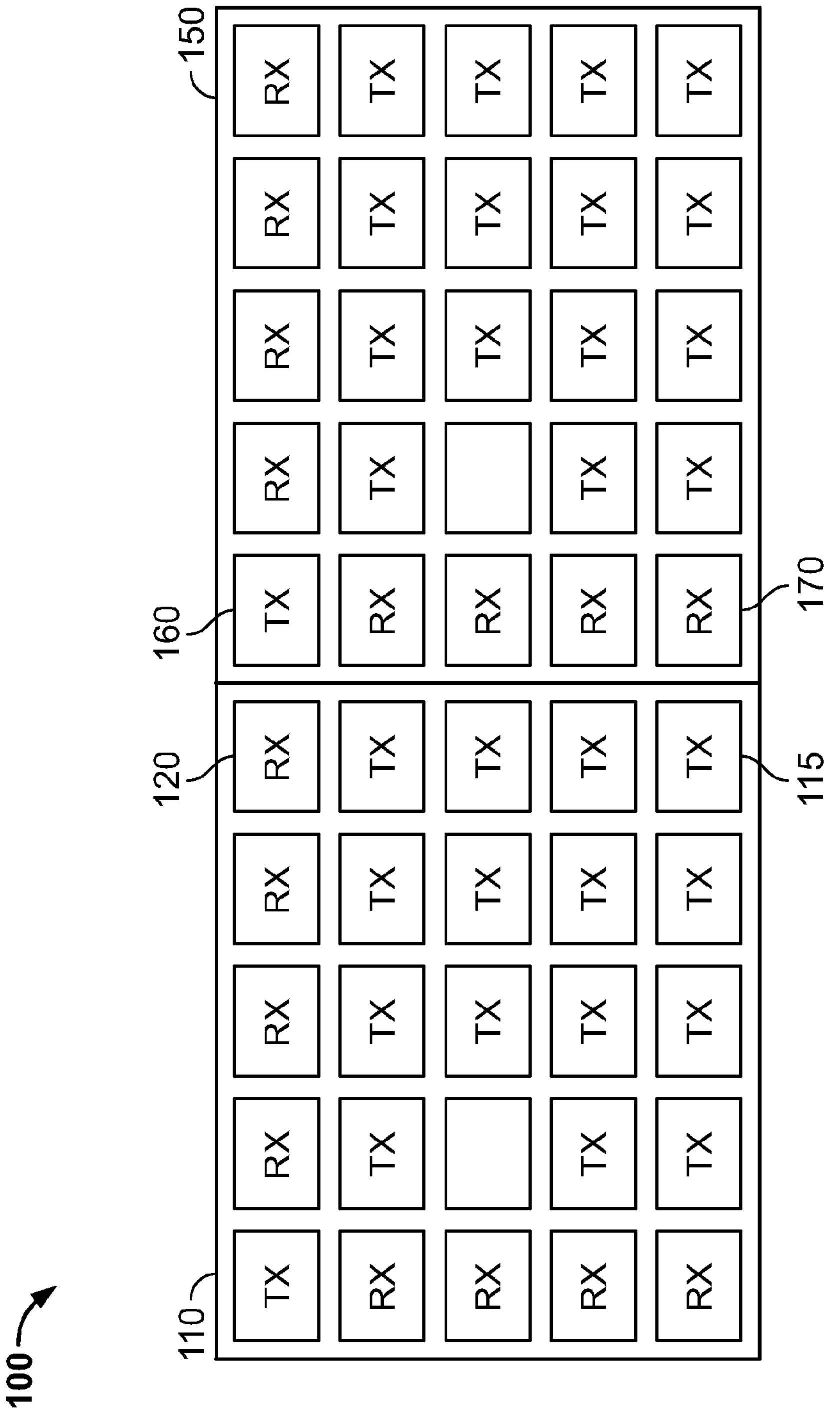
FIG. 1 shows a block diagram of a phased array system configuration.

As described, large-scale phased arrays can be arranged in a distributed architecture comprising multiple cells or tiles (referred hereinafter as tiles), with each tile comprising various system elements. FIG. 1 shows a simplified block diagram of two (2) adjacent tiles 110 and 150 in an exemplary phased array system configuration 100. In this example, tile 110 includes a 16TX/8RX configuration, i.e., 16 transmitter blocks 115 and 8 receiver blocks 120. Similarly, tile 150 has a 16TX/8RX configuration with 16 transmitter blocks 160 and 8 receiver blocks 170. In one example of a phased array system according to an embodiment, sixteen (16) tiles each having a similar configuration as tiles 110 and 150 can be combined onto a printed circuit board (PCB) to create a 384-element phased array system, e.g., a 256TX/128RX configuration with 256 transmitter blocks and 128 receiver blocks. It should be noted that the configuration in FIG. 1 is meant to be illustrative only and not limiting in any manner. For example, embodiments described herein can be applied to various nTX/mRX tile configurations where n and m are integers, e.g., 8TX/16RX or any number of other combinations that may be a matter of design choice, network requirements and/or other considerations. As such, a large-scale phased array can take on various forms in terms of number of tiles and the density of the sub-arrays on the respective tiles (e.g., the TX/RX configuration and so on).

Continuing with the example shown in FIG. 1, tiles 110 and 150 are organized in rows and columns and are electrically coupled to each other and to other respective, adjacent tiles, e.g., each tile is coupled to at least a previous and a next tile. Although elements within a single tile (e.g., components of transmitter blocks 115 and receiver blocks 120 within tile 110) can be electrically aligned with each other for ensuring signal integrity, elements between two adjacent tiles are not necessarily aligned, and thus require additional alignment processes to maintain signal integrity. That is, signals distributed between tile 110 and tile 150 will not necessarily be phase balanced. For a large-scale phased array, it is desired that the distribution of signals to all tiles in the phased array be phase balanced for effective beamforming, which can be very complicated especially when distributing signals at high frequencies, e.g., mm-wave signals in 5G communication network. For example, consider the case similar to FIG. 1 in which transmitter block 115 in tile 110 is coupled to receiver block 170 in tile 150 (and transmitter block 160 in tile 150 is coupled to receiver block 120 in tile 110. Each of tiles 110 and 150 includes a respective local oscillator (LO) and a respective mixer, not shown. In operation, the phase of the LO in tile 110 may be different than the phase of the LO in adjacent tile 150, which therefore gives rise to LO mis-alignments between the two tiles. LO mis-alignments between tiles in a phased array system can negatively affect beamforming. For example, without tile-to-tile alignment, the relative phase between every tile is randomized therefore resulting in a random beam pattern.

One possible alignment approach is to utilize a receiver to detect/monitor the strength of a transmitted signal while continuously varying the phase at the transmitter until an optimum value for signal strength is detected at a receiver, with the optimum value being indicative of alignment being reached. However, this approach can be impractical when a large number of antennas in the array need to be aligned. Additionally, this solution can be an inefficient use of resources as it would typically require an external element (e.g., a remote receiver) to perform the alignment.

According to the various embodiments described herein, tile-to-tile alignment is achieved by utilizing a self-alignment technique that does not require external components for performing alignment, but instead takes advantage of the close proximity and coupling paths of the antennas on adjacent tiles and utilizes existing circuitry and functionality within the tiles. The position of various antennas on the respective pairs of adjacent tiles is selected so that bidirectional coupling paths between adjacent transmit and receive antenna elements enable tile-to-tile alignment in a multi-tile, large-scale phase array system. More specifically, the selection of the antennas with existing coupling paths between adjacent tiles is utilized to measure the relative phase of the local oscillator (LO) signals between the neighboring tiles. Once phase is aligned between two adjacent tiles, the process can be subsequently repeated for the remaining adjacent tile pairs until all tiles are aligned. Notably, self-alignment/self-calibration can be performed during system setup (e.g., power up), and there is no need to generate a specific intermediate frequency (IF) signal at baseband because only the internally-generated LO signals are needed to facilitate the measurements. Moreover, phase alignment will be maintained as long as the system is not shut down. In the case of a system shutdown, self-calibration can be performed again to align and phase balance the signals being distributed across the tiles in the phased array system.

Figure 2A:
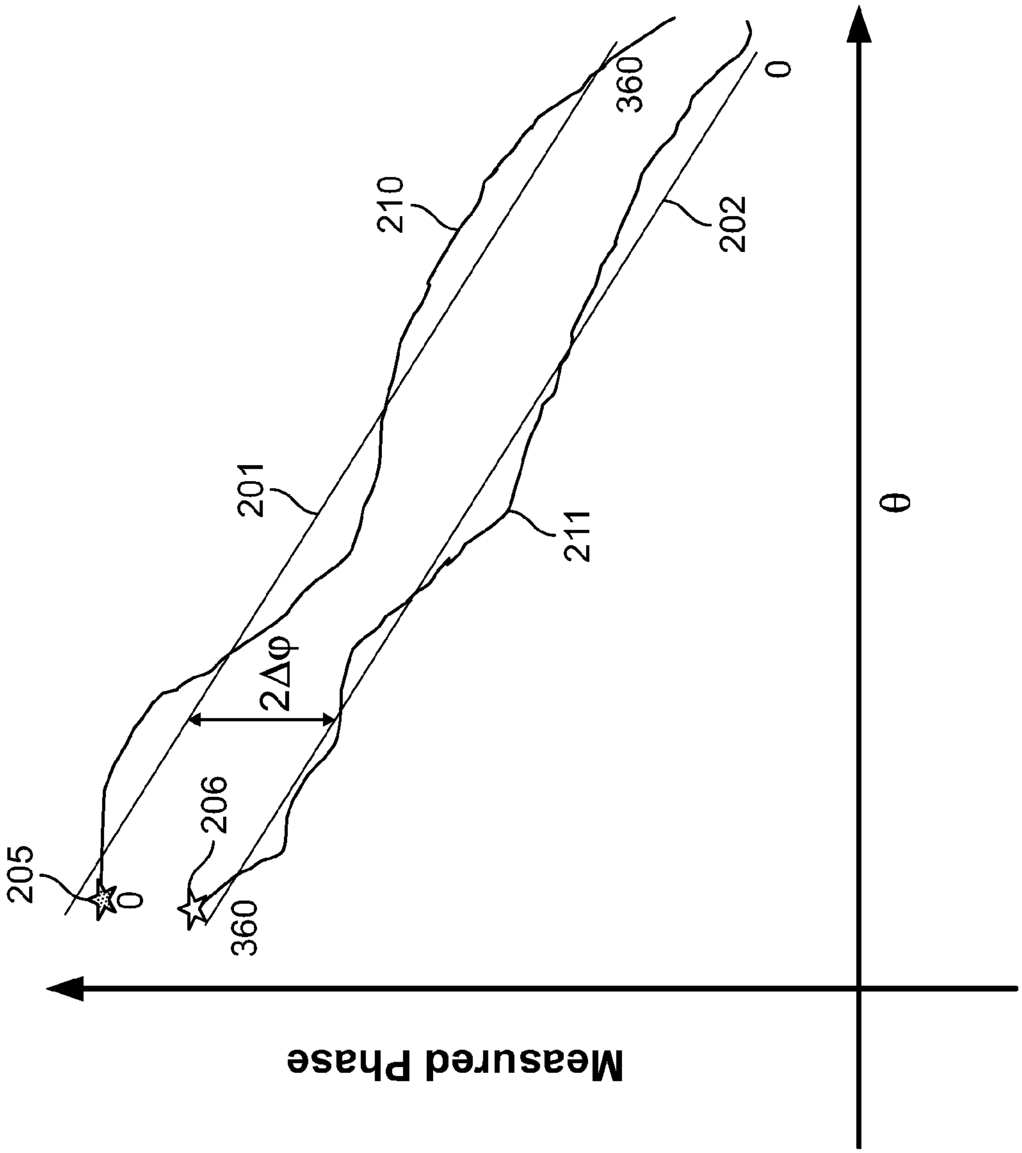
FIGS. 2A and 2B show graphical representations of phase relationships of local oscillator signals in a multi-tile configuration according to various embodiments.

FIG. 2A shows a simplified graphical representation to illustrate the basic principles relating to the measurement of the relative phase of the local oscillator (LO) signals between the two adjacent tiles 110 and 150 from FIG. 1. As will be described in further detail below, a first LO signal is transmitted from a first tile to an adjacent tile, e.g., from transmitter block 160 in tile 150 to receiver block 120 in tile 110, and the phase of the first LO signal is measured at receiver block 120. In a similar manner, a second LO signal is transmitted from transmitter block 115 in tile 110 to receiver block 170 in tile 150, i.e., in the direction opposite to the direction of the first LO signal transmission, and the phase of the second LO signal is measured at receiver block 170. As will be understood by those skilled in the art, such measurements can be obtained by sweeping the phase of the respective oscillators from 0 to 360 degrees to obtain multiple phase measurements and derive the relative phase shifts. Alignment of the first and second LO signals is achieved when the measured phase of each of the first and second LO signals have the same or substantially the same value. If the measured values indicate a phase difference, then actions can then be taken to reduce this phase difference to approximately zero, e.g., by changing the phase of one of the LO signals by an amount that is equal to the phase difference, thus obtaining signal alignment between adjacent tiles 110 and 150.

As shown in FIG. 2A, plot lines 201 and 210 correspond to a phase representation for the first LO signal transmitted in one direction from tile 150 to 110. More specifically, plot line 210 represents actual phase measurements obtained from sweeping the phase of the first LO from 0 to 360 degrees, e.g., multiple phase measurements obtained by sweeping the phase of the first LO in tile 150. Plot line 201 represents the "best fit" line corresponding to the actual phase measurements in plot line 210. Because the relationship between received phase and transmitted phase should be linear, a "best fit" linear approximation can be made to fit the measured phases. Similarly, plot lines 202 and 211 correspond to a phase representation for the second LO signal transmitted in the opposite direction from tile 110 to tile 150. More specifically, plot line 211 represents actual phase measurements obtained from sweeping the phase of the second LO from 0 to 360 degrees and plot line 202 represents the "best fit" line corresponding to the actual phase measurements in plot line 211. Sweeping the phase of the respective oscillators to obtain multiple measurements and using a "best fit" approach can provide a more accurate estimate of relative phase than by using single measurements. For example, points 205 and 206 represent a single measurement of phase for the first and second LO signals, respectively. The accuracy in using multiple measurements, e.g., from sweeping, is apparent when comparing results from using single measurement points, e.g., points 205 and 206, versus sweeping phase to obtain "best fit" lines 201 and 202 as shown in FIG. 2A.

The resulting plot lines 201, 202, 210 and 211 in FIG. 2A therefore show a simplified phase representation from 0 to 360 degrees of the respective LO signals. Note that the LO signals have the same frequency, but are phase shifted. As will be described in further detail below, a phase shifter associated with the respective local oscillator on the transmitter side is swept from 0 to 360 degrees to facilitate the phase measurements on the receiver side.

Returning to FIG. 2A, the phase representations shown by plot lines 201 and 202 have an offset of $2\Delta\phi$ with respect to each other, e.g., the offset represents twice the value of the phase difference ($\Delta\phi$) between the two LO signals. Thus, upon measuring and obtaining this offset value, the phase difference can be obtained. A phase shift equivalent to the phase difference $\Delta\phi$ can then be applied in the signal transmission between the tiles, e.g., a phase shift equivalent to the phase difference $+\Delta\phi$ may be applied in the signal transmission from one of the tiles, or alternatively, an opposite phase shift of $-\Delta\phi$ may be applied in the signal transmission in an opposite direction from the other tile. Through such phase matching, signal alignment between the two tiles is thereby achieved.

Figure 2B:
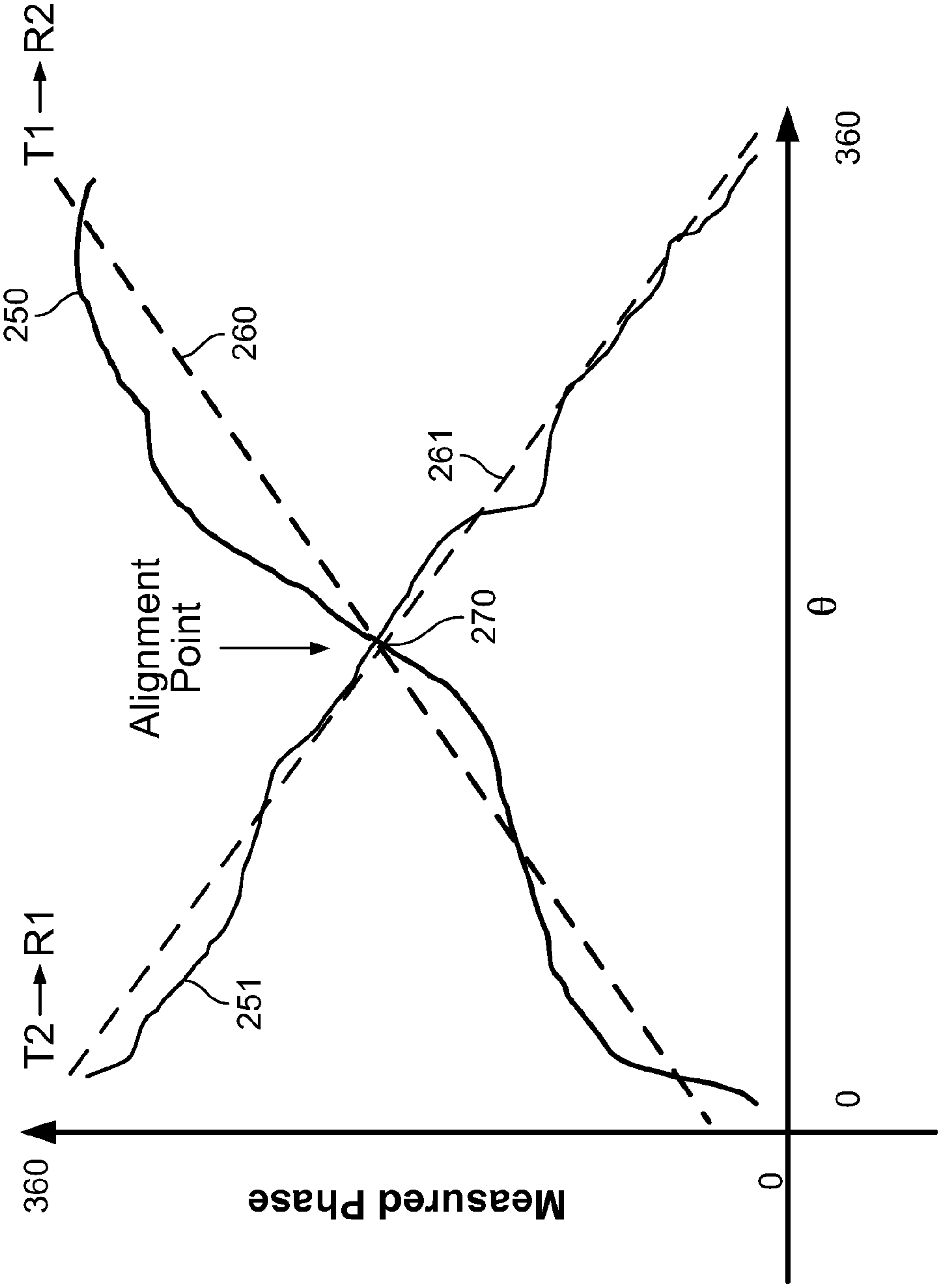

FIG. 2B shows another embodiment for measuring the phase of the first and second LO signals. In this example, only the phase of the first LO is swept (e.g., from 0 to 360 degrees) while the phase of the second LO is kept unchanged. Plot line 250 represents the phase measurements for the first LO signal (e.g., from transmitter T1 in the first tile to receiver R2 in the second tile). More specifically, at each sweep point (along plot line 250), the first LO signal is transmitted from the first tile and the resulting phase is measured on the receiver in the second tile. At each of the aforementioned sweep points, the second LO signal is transmitted from the second tile and the resulting phase is recorded by the receiver at the first tile. Those measurements taken for the second LO signal are shown by plot line 251 (e.g., from transmitter T2 in the second tile to receiver R1 in the first tile). For the next and subsequent measurements, the phase of the first LO signal is incremented and the measurements are performed again for each of the first and second LO signal. Accordingly, the phase of the first LO signal is swept and measured, while the phase of the second LO signal is only measured at each of the corresponding sweep points for the first LO signal, i.e., the phase of the second LO signal is not swept and instead remains unchanged. Plot lines 260 and 261 represent the "best fit" lines for the respective phase measurements from plot lines 250 and 251, respectively. With this approach, alignment is achieved when the phase of the first LO signal, measured at the second tile, is equal to the phase of the second signal measured at the first tile, as shown in FIG. 2B as alignment point 270.

Figure 3:
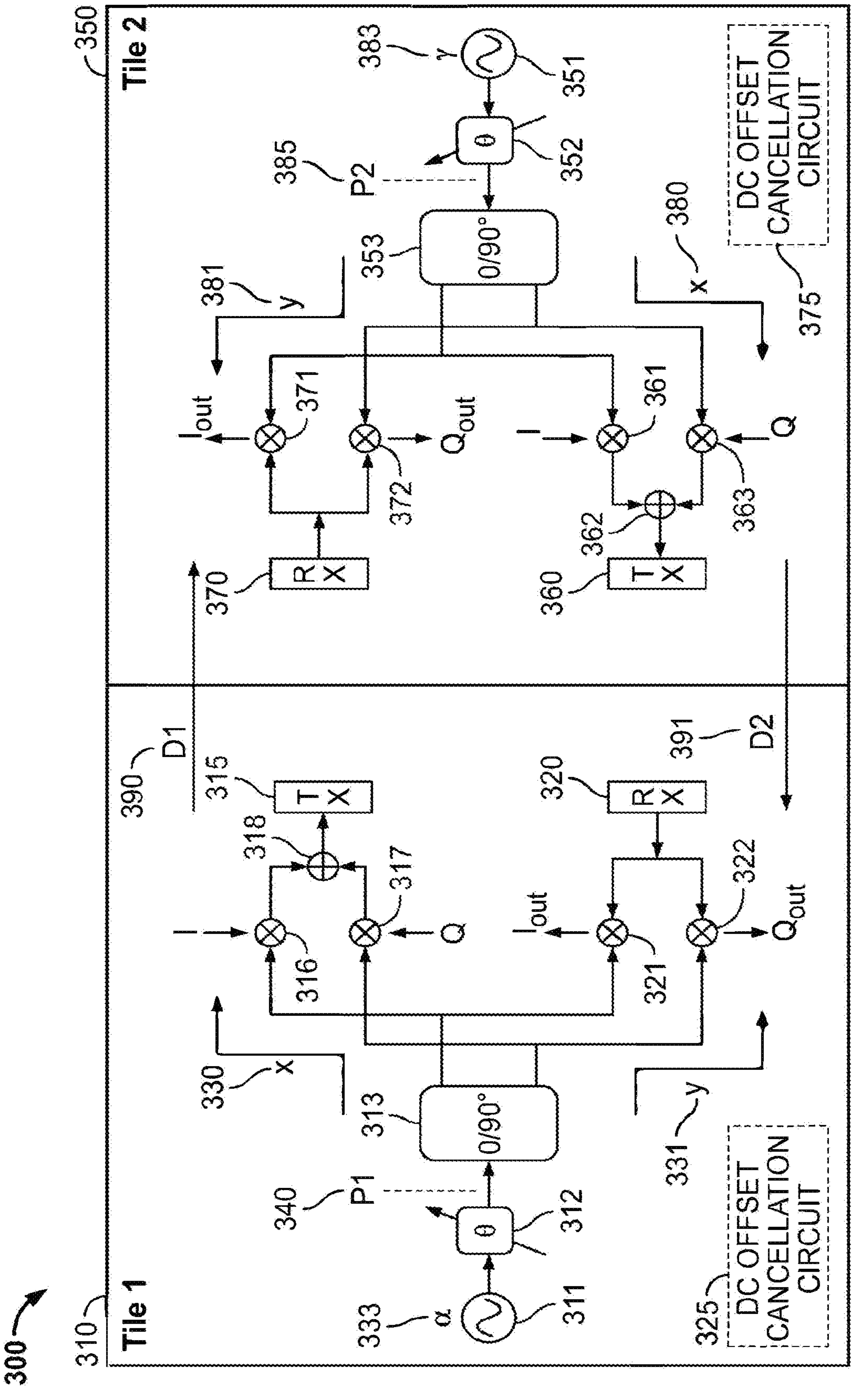
FIG. 3 shows a block diagram of a tile-to-tile coupling configuration in a phased array system according to an illustrative embodiment.

Various embodiments for implementing the self-alignment procedure will now be described in further detail. FIG. 3 shows one illustrative embodiment of a tile-to-tile coupling configuration 300 of a phased array system, in which tile 310 (tile 1) is adjacent to tile 350 (tile 2). In this example, two adjacent tiles are shown for purposes of illustrating the self-alignment procedure, although adjacent tiles 310 and 350 can be part of a large-scale phased array system comprising multiple tiles, such as the aforementioned 16-tile phased array configuration as one non-limiting example. Moreover, configuration 300 is a simplified block diagram showing only a subset of the full complement of components in a typical tile. Each tile in a phased array system may typically include an RF integrated circuit (RFIC) further integrated with all the antenna sub-arrays on that tile (e.g., a 16TX/8RX phase shifter array, etc.). In FIG. 3, tiles 310 and 350 are simplified to show just one transmitter and receiver for each tile, along with only a subset of the associated components, although it will be appreciated that a full representation of a tile would include the full complement of transmitters and receivers, associated components, and a signal distribution network for routing the various signals via the RFIC on the tile. Such components would include, for example: antenna sub-arrays, up-converters/down-converters (mixers, multipliers, etc.), an analog baseband block, a phase-locked loop (PLL) circuit, diagnostic circuits for performance monitoring and so on. An intra-tile signal distribution network facilitates passive and active signal distributions to provide the RF signal path to all antenna elements.

Referring again to FIG. 3, tile 310 includes transmitter 315 and receiver 320. For simplicity of description, tile 310 is shown to include local oscillator (LO) circuit 311, which works in conjunction with phase shifting elements 312 and 313 to provide the phase shifted LO signals to the respective in-phase/quadrature (I/Q) mixer circuits for appropriate up-conversion for transmission and down-conversion for signal reception. More specifically, I/Q mixers 316, 317, and 318 provide up-conversion for signal transmission via transmitter 315 while I/Q mixers 321 and 322 would provide down-conversion for signal reception via receiver 320. Tile 310 is also shown to include DC offset cancellation circuit block 325, which will be described in further detail below. Tile 350 is shown to include similar elements as in tile 310 to perform the same functions in tile 350, such as: transmitter 360; receiver 370; local oscillator (LO) circuit 351; phase shifting elements 352 and 353; I/Q mixers 361, 362, 363, 371 and 372; and DC offset cancellation circuit block 375.

Also shown in FIG. 3 are various parameters that should be considered in the course of measuring and calculating the relative phase shifts and phase differences during the self-alignment procedure. Without accounting for the delays, both "intra-tile" and "inter-tile" delays, alignment between tiles will not be possible. Such delay parameters may include parameters that are adjustable as well as some that are not adjustable. In one illustrative embodiment, as shown in FIG. 3, these parameters include the delay between tiles 310 and 350 (i.e., inter-tile delay), which is represented by arrow 390 for the delay D1 from tile 310 to tile 350 and by arrow 391 for the delay D2 from tile 350 to tile 310. Although delays D1 and D2 may not be the same value in all scenarios, the self-alignment procedure according to one illustrative embodiment assumes that inter-tile delays D1 and D2 are the same in both directions.

As referenced above, tiles 310 and 350 have been simplified to each show a single transmitter and single receiver. However, in practice, each of tiles 310 and 350 have multiple transmitters and multiple receivers, e.g., 16 transmitters and 8 receivers each, for the aforementioned example. As such, each tile will have its respective signal distribution network to route signals via the various components to the respective plurality of transmitters and receivers. For example, the LO signal (e.g., voltage-controlled oscillator (VCO) signal) is phase shifted, mixed with I/Q baseband IF signals, and then split (for routing to transmitters) or combined (in a receiver) onto multiple paths for respective routing and distribution among the elements on a tile. The signal distribution network on each tile will therefore introduce intra-tile delays associated with the routing of signals within the tile. In FIG. 3, these intra-tile delay parameters are shown as x 330/380 and y 331/381, which are also constants like inter-tile delays D, e.g. not adjustable. More specifically, x 330/380 represents the delay in the respective transmit paths for each of tiles 310 and 350, while y 331/381 represents the delay in the respective receive paths of each of tiles 310 and 350.

Parameters α 333 and γ 383 are adjustable parameters relating to the phase shift operations on the LO signals, e.g., sweeping the phase of the oscillator to get phase measurements to determine relative phase shifts using, for example, phase shifting elements 312 and 352 in each of tiles 310 and 350, respectively. Parameters α 333 and γ 383 may therefore also be taken into account for the measurement of the phase differences between the LO signals in tiles 310 and 350.

Figure 4:
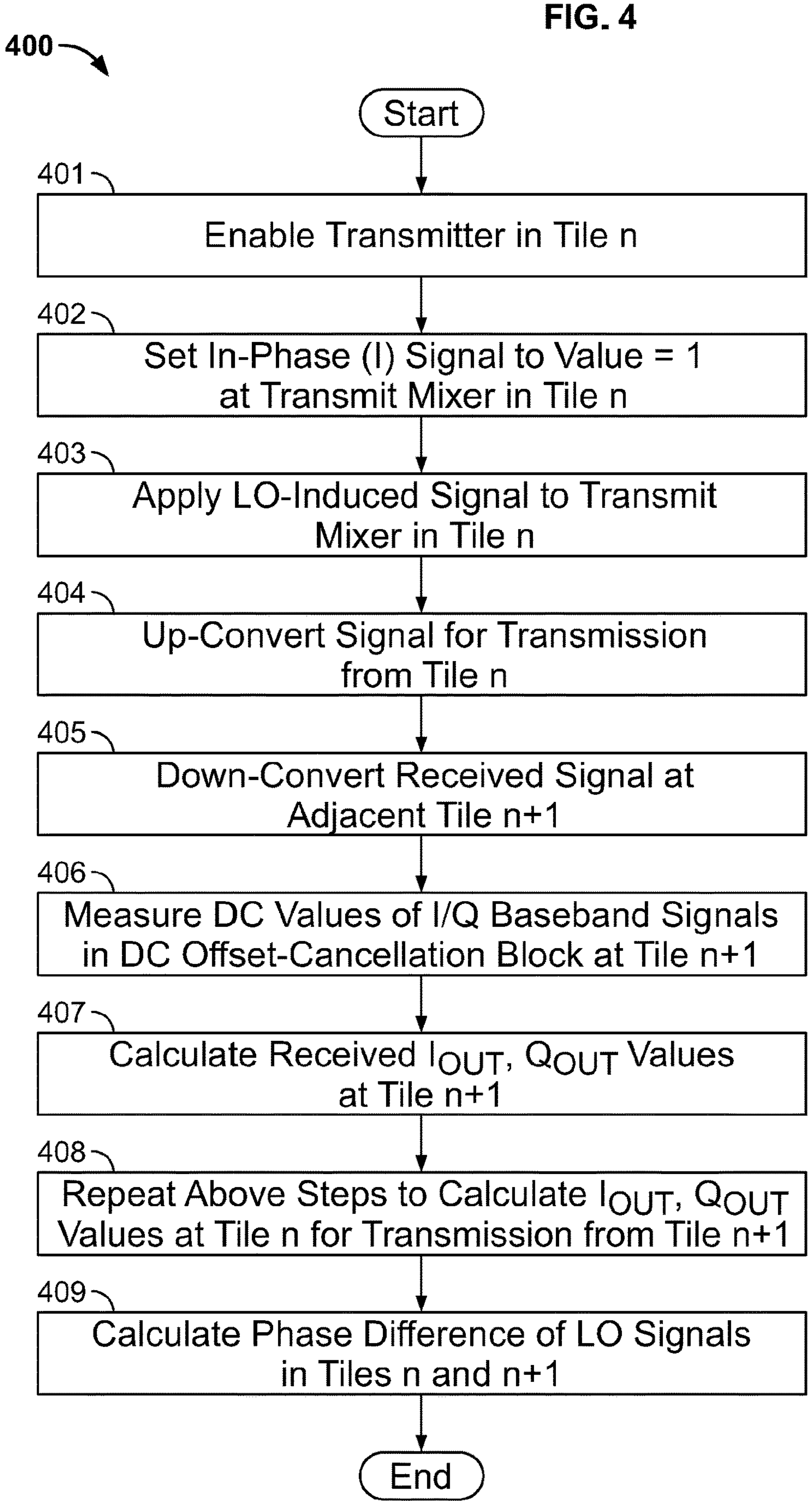
FIG. 4 shows a flowchart of a tile-to-tile phase alignment method according to an illustrative embodiment.

The various steps to perform tile-to-tile self-alignment, as shown in flowchart 400 of FIG. 4, will be described with reference to the illustrative multi-tile configuration 300 shown in FIG. 3. In step 401, transmitter 360 in tile 350 is enabled and, in step 402, $I_{in(2)}$ is set to a constant value (e.g., Value=1), wherein $I_{in(2)}$ represents the in-phase baseband signal input for tile 350 ("Tile 2"). As previously indicated, tile-to-tile self-alignment is performed without the need to generate an additional and specific baseband signal. The LO signal is generated from tile 350 and allowed to "leak", as will be described in further detail below, thereby applying an LO-induced DC offset to the transmit mixer 361 in step 403 for up-conversion in step 404. The up-converted signal transmitted from transmitter 360 in tile 350 is received and down-converted, in step 405, at receiver 320 in adjacent tile 310. Notably, the LO signals generated from tiles 350 and 310 have the same frequency, but different phase, so when the LO signal from tile 350 is transmitted to tile 310, the LO signals down-convert into a DC value at the I and Q receive mixers 321 and 322 in tile 310. In step 406, the DC value is measured using DC offset cancellation circuit block 325 in the analog baseband block of tile 310. $I_{out(1)}$ and $Q_{out(1)}$ at tile 310 are calculated in step 407 and represented as:

$$I_{out1}=\cos(\omega t+\gamma+x+D_2)\cdot\cos(\omega t+\alpha+y)=\cos(D_2+x-y+\gamma-\alpha)=\cos(\rho_2-\varphi);\text{ and}$$

$$Q_{out1}=\cos(\omega t+\gamma+x+D_2)\cdot\sin(\omega t+\alpha+y)=-\sin(D_2+x-y+\gamma-\alpha)=-\sin(\rho_2-\varphi),$$

where:

$$\rho_2=D_2+x-y;\text{ and }\varphi=\alpha-\gamma;$$

φ represents the phase difference between the two tiles;
ω is the angular frequency;
γ is a parameter associated with phase shifting the local oscillator signal in tile 350;
α is a parameter associated with phase shifting the local oscillator signal in tile 310;
x and y are parameters representing intra-tile delay in tiles 310 and 350; and
is a parameter representing inter-tile delay between tiles 310 and 350

$$I_{out1}=\cos(\omega t+\gamma+x+D_2)\cdot\cos(\omega t+\alpha+y)=\cos(D_2+x-y+\gamma-\alpha)=\cos(\rho_2-\varphi);\text{ and}$$

$$Q_{out1}=\cos(\omega t+\gamma+x+D_2)\cdot\sin(\omega t+\alpha+y)=-\sin(D_2+x-y+\gamma-\alpha)=-\sin(\rho_2-\varphi),$$

where:

$$\rho_2=D_2+x-y\text{ and }\varphi=\alpha-\gamma;$$

φ represents the phase difference between the two tiles;
ω is the angular frequency;
γ is a parameter associated with phase shifting the local oscillator signal in tile 350;
α is a parameter associated with phase shifting the local oscillator signal in tile 310;
x and y are parameters representing intra-tile delay in tiles 310 and 350; and
D2 is a parameter representing inter-tile delay between tiles 310 and 350 (FIG. 3).

Next, in step 408, steps 401 through 407 are applied to the transmission in the opposite direction from tile 310 to 350 to calculate $I_{out(2)}$ and $Q_{out(2)}$ at tile 350. More specifically, transmitter 315 in tile 310 is enabled, $I_{in(1)}$ is set to a value of 1, the LO signal is generated from tile 310 and allowed to "leak", thereby applying an LO-induced DC offset to the transmit mixer 316 for up-conversion, transmission and down-conversion at receiver 370 in adjacent tile 350. The DC value is measured using DC offset cancellation circuit block 375 in the analog baseband block of tile 350. $I_{out(2)}$ and $Q_{out(2)}$ at tile 350 are calculated and represented as:

$$I_{out2}=\cos(\omega t+\alpha+x+D_1)\cdot\cos(\omega t+\gamma+y)=\cos(D_1+x-y-\gamma+\alpha)=\cos(\rho_1+\varphi);\text{ and}$$

$$Q_{out2}=\cos(\omega t+\alpha+x+D_1)\cdot\sin(\omega t+\gamma+y)=-\sin(D_1+x-y-\gamma+\alpha)=-\sin(\rho_1+\varphi),$$

where:

$$\rho_1=D_1+x-y;\text{ and}$$

D1 is a parameter representing inter-tile delay between tiles 310 and 350 (FIG. 3).

The received I and Q values are then used to calculate the required phase correction in step 409 for the tile-to-tile alignment of signals between tiles 310 and 350. In the case where D1=D2:

$$\rho_1=\rho_2=\rho.$$

The measured I and Q values can be used to calculate the angles:

$$\angle 2=\tan^{-1}\left(\frac{-Q_{out2}}{I_{out2}}\right)=\rho+\varphi,$$

$$\angle 1=\tan^{-1}\left(\frac{-Q_{out1}}{I_{out1}}\right)=\rho-\varphi.$$

The angles can be used to find the phase offset between the two tiles ($\varphi$):

$$\frac{\angle 2-\angle 1}{2}=\varphi=\alpha-\gamma$$

where:

$\angle 1$ represents the angle of the received $I_{out1}$ and $Q_{out1}$ values; and $\angle 2$ represents the angle of the received $I_{out2}$ and $Q_{out2}$ values.

In the case where D1≠D2, a factory calibration should be performed in which an initial phase correction ($\varphi_{old}=\alpha_{old}-\gamma_{old}$) and corresponding $\angle 1_{old}$ and $\angle 2_{old}$ are measured and stored per tile, e.g., $$\angle 1_{old}=\rho_1-\varphi_{old},\text{ and}$$

$$\angle 2_{old}=\rho_2+\varphi_{old}.$$

In the case of a system shut-down and subsequent power-on, the new phase correction required for alignment can be calculated from new angle measurements and the previously stored values as follows:

$$\angle 1_{new}=\tan^{-1}\left(\frac{-Q_{out1}}{I_{out1}}\right)=\rho_1-\varphi_{new};$$

$$\angle 2_{new}=\tan^{-1}\left(\frac{-Q_{out2}}{I_{out2}}\right)=\rho_2+\varphi_{new};\text{ and}$$

$$\frac{\angle 2_{new}-\angle 1_{new}-(\angle 2_{old}-\angle 1_{old})}{2}+\varphi_{old}=\varphi_{new}.$$

Tiles 310 and 350 are deemed to be aligned when the phase at reference point P1 in FIG. 3, shown at position 340 in tile 310, is equal to or substantially equal to the phase at reference point P2, shown as position 385 in tile 350.

According to another embodiment, multiple measurements of $\angle 1$ and $\angle 2$ can be made by sweeping the phase shifters in each of tiles 310 and 350. In this manner, multiple measurements can be used to find the best fit of $\angle 1$ and $\angle 2$. More specifically, this is accomplished during the self-alignment process described above by using the respective LO phase shifters on the transmit side in each direction (e.g., phase shifter 352 for transmission from tile 350 to tile 310 and phase shifter 312 for transmission from tile 310 to 350). For example, phase shifter 352 for the LO signal in tile 350 can be swept, in one illustrative embodiment, from 0 to 360 degrees and the received I and Q signals on the receive side in tile 310 are measured accordingly.

According to the various embodiments described herein, the tile-to-tile alignment takes advantage of the coupling paths that already exist between the transmit/receive antenna elements in adjacent tiles. The self-alignment can also be done prior to powering on the system and by utilizing existing circuits, components and signals to realize various efficiencies. As mentioned, there is no need to generate an additional and specific baseband signal for performing the above measurements. Instead a DC constant (voltage) can be applied to the transmit mixers.

Furthermore, the existing, internally-generated LO signals can be utilized for all measurement and alignment purposes. Features and functionality of existing circuitry (such as DC offset cancellation circuits) that are already included in the tiles can be utilized to facilitate measurements and calculations for effecting signal alignment. For example, the DC offset cancellation circuits in the analog baseband block are typically used to cancel any LO-induced DC offsets originating from the I/Q down-converter mixers. However, in performing tile-to-tile self-alignment according to the various embodiments, the detected I/Q DC terms are internally digitized and used in a novel way to measure the relative phase between tiles in the multi-tile phased array system. In this manner, the various embodiments take advantage of using features in the DC offset cancellation circuit that are already available but conventionally not used for the purposes as described herein. DC offset values, which in conventional systems are detected but discarded, are effectively used in the described embodiments for detecting and calculating the phase difference between the LO signals of the two adjacent tiles. This is possible because the LO signals have the same frequency but different phases, so when the LO signal from one tile is transmitted to the next tile and mixes with the LO signal of the latter tile, they down-convert into a DC value. The measurement of this DC value is performed by the existing DC offset cancellation circuitry resident in each tile. This value may then be digitized and used for calculating the phase difference.

Figure 5:
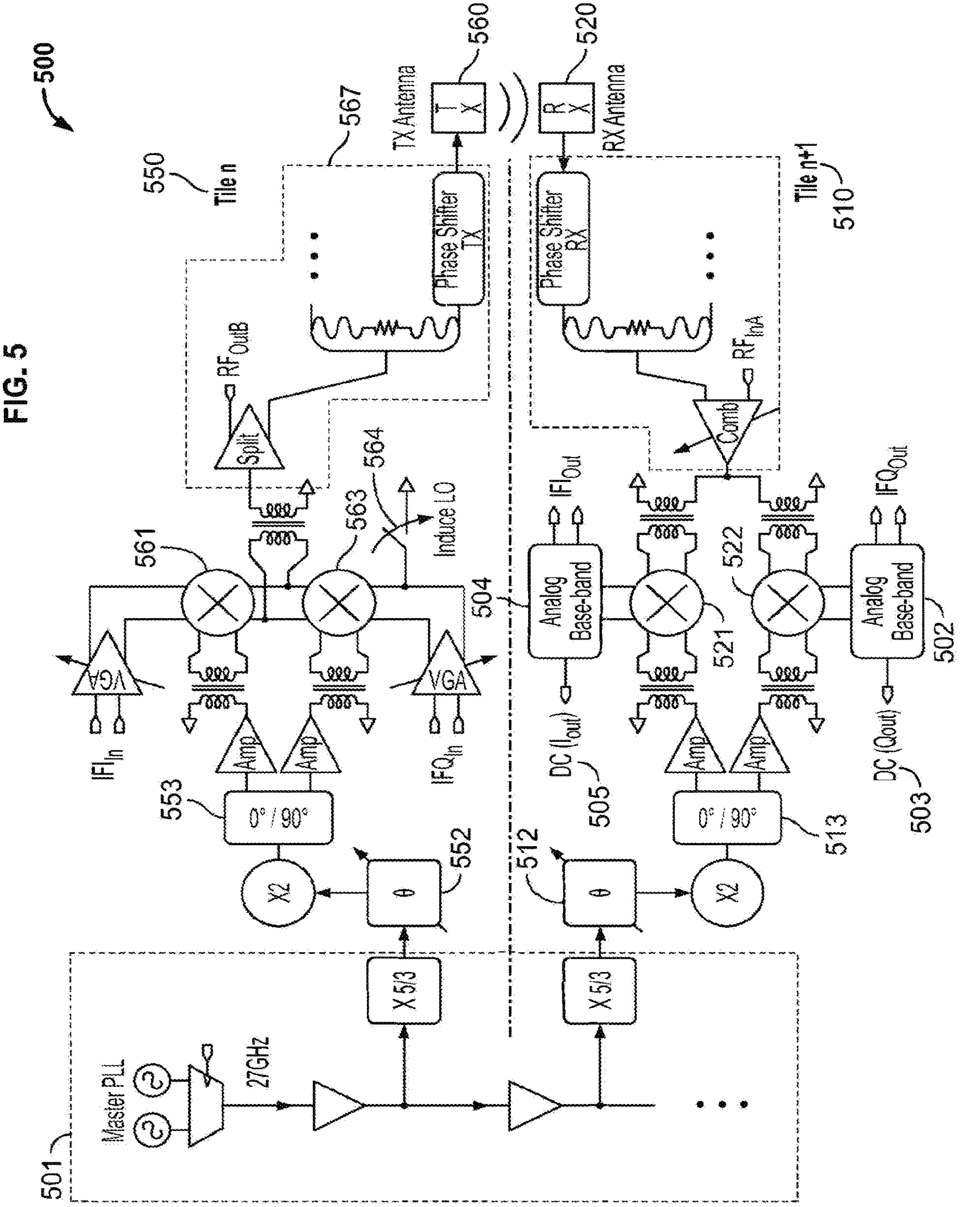
FIG. 5 shows a block diagram of a tile-to-tile coupling configuration in a phased array system according to an illustrative embodiment.

FIG. 5 shows another illustrative embodiment of a tile-to-tile coupling configuration 500 of a phased array system, in which tile 550 (tile n) is adjacent to tile 510 (tile n+1). For ease of illustration and description, configuration 500 is a simplified block diagram again showing only a subset of components with a focus on the coupling of transmit antenna 560 in tile 550 with receive antenna 520 in tile 510. Various components and functionality described previously in the context of the embodiment shown in FIG. 3 will be similarly applicable to the present embodiment in FIG. 5 and therefore will not be described in detail for sake of brevity. As represented by distribution network 567, tile 550 actually includes a plurality of other transmit and receive antennas in addition to transmit antenna 560 (shown). RF signals in tile 550 are split and then routed to a plurality of transmit antennas for transmission and, conversely, RF signals are received by a plurality of receive antennas and combined for further routing and processing in tile 510. Configuration 500 further includes master phase-locked loop (PLL) circuit 501 with associated components to provide the local oscillator signals to each of tiles 550 and 510, as well as the other tiles (not shown) in the large-scale phased array. Similar to the embodiment in FIG. 3, tiles 510 and 550 each include phase shifter elements 512/513 and 552/553, respectively, for phase shifting the respective LO signals.

Tile 550 is shown to include I/Q mixers 561 and 563, respectively, for up-conversion. Similarly, tile 510 includes I/Q mixers 521 and 522, respectively, which feed the I/Q signals to analog baseband blocks 504 and 502, respectively. Importantly, switch (induce LO switch) 564 is utilized in this embodiment for "leaking" the internally-generated LO signal for up-conversion and transmission to tile 510. In this manner, the self-alignment/self-calibration process can be performed without the need for any external signals and can be performed as part of system check/startup, e.g., to align the multi-tile phased array before the system is placed into operation in a live network.

As will be further described below, the analog base-band block includes circuitry (not shown in FIG. 5) for cancelling any LO-induced DC offsets originating from the I/Q down-converter mixers (521 and 522). As mentioned in the foregoing description, DC offset-cancellation circuitry traditionally serves the sole purpose of ensuring the high-gain IF amplifier stages are not saturated under strong LO injection conditions. However, in the present embodiment, the detected I/Q DC terms are internally digitized and used in a novel calibration scheme to measure the relative phase between tiles in the multi-tile phased array system. As shown, the DC values 505 for $I_{out}$ and 503 for $Q_{out}$ are produced in tile 510 as a consequence of the down-conversion of the received signal from tile 550 in which the LO was "leaked" and in which a constant DC voltage is applied for the I/Q signals in the transmit mixers (561 and/or 563) in tile 550. DC values 505 for $I_{out}$ and 503 for $Q_{out}$ are then further processed by the DC offset cancellation circuitry in analog baseband circuits 504 and 502, respectively.

Figure 6:
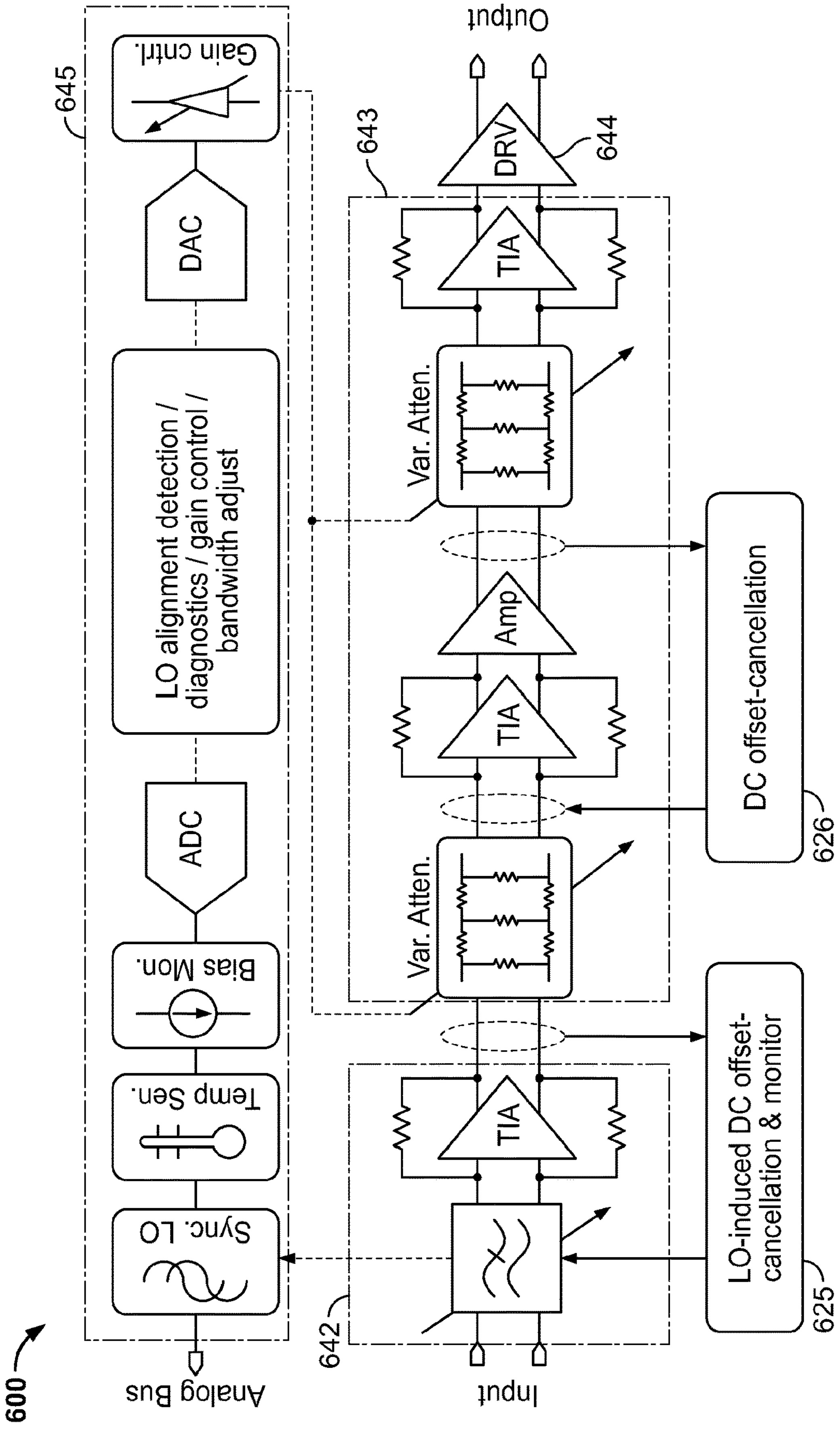
FIG. 6 shows a block diagram of an illustrative configuration of elements in an analog baseband block according to the embodiment of FIG. 5.

FIG. 6 shows a block diagram of some of the elements in an analog baseband block 600 according to the embodiment of FIG. 5. In particular, analog baseband block 600 is shown to include a tunable low-pass active filter 642 and associated components (e.g., a trans-impedance amplifier (TIA), etc.) for receiving the input signals, a pair 643 of ladder-attenuator VGAs and associated components, a linear output driver 644, and a monitoring/control section 645. Notably, analog baseband block 600 includes two DC offset cancellation feedback loops/blocks 625 and 626, in which LO-induced DC offset-cancellation block 625 performs the further processing of the DC values 505 for $I_{out}$ and 503 for $Q_{out}$ (from FIG. 5) to measure the phase differences in the LO signals in adjacent tiles according to various embodiments.

Figure 7:
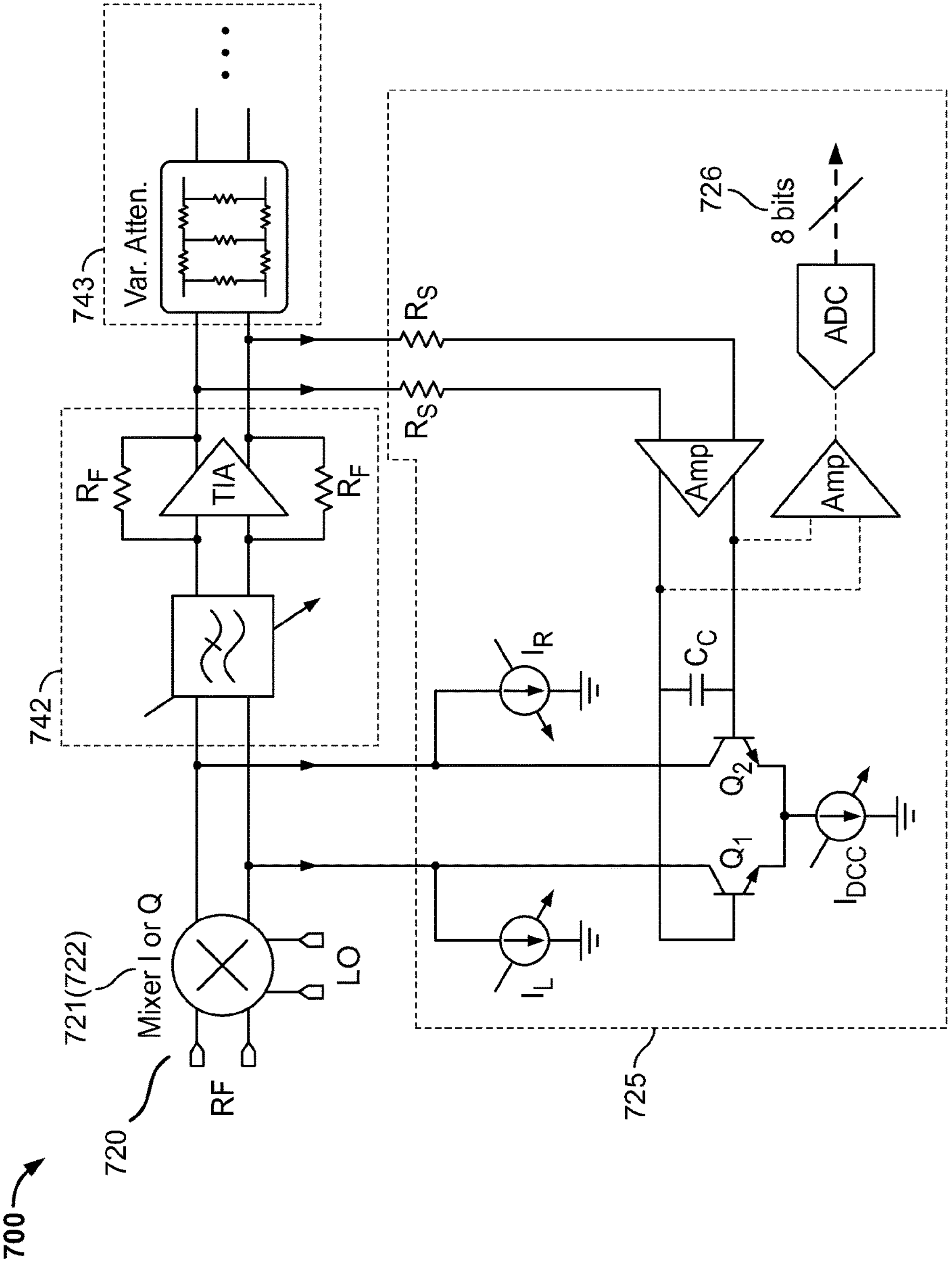
FIG. 7 shows a schematic diagram of an illustrative offset cancellation block according to the embodiment of FIG. 6.
Figure 8:
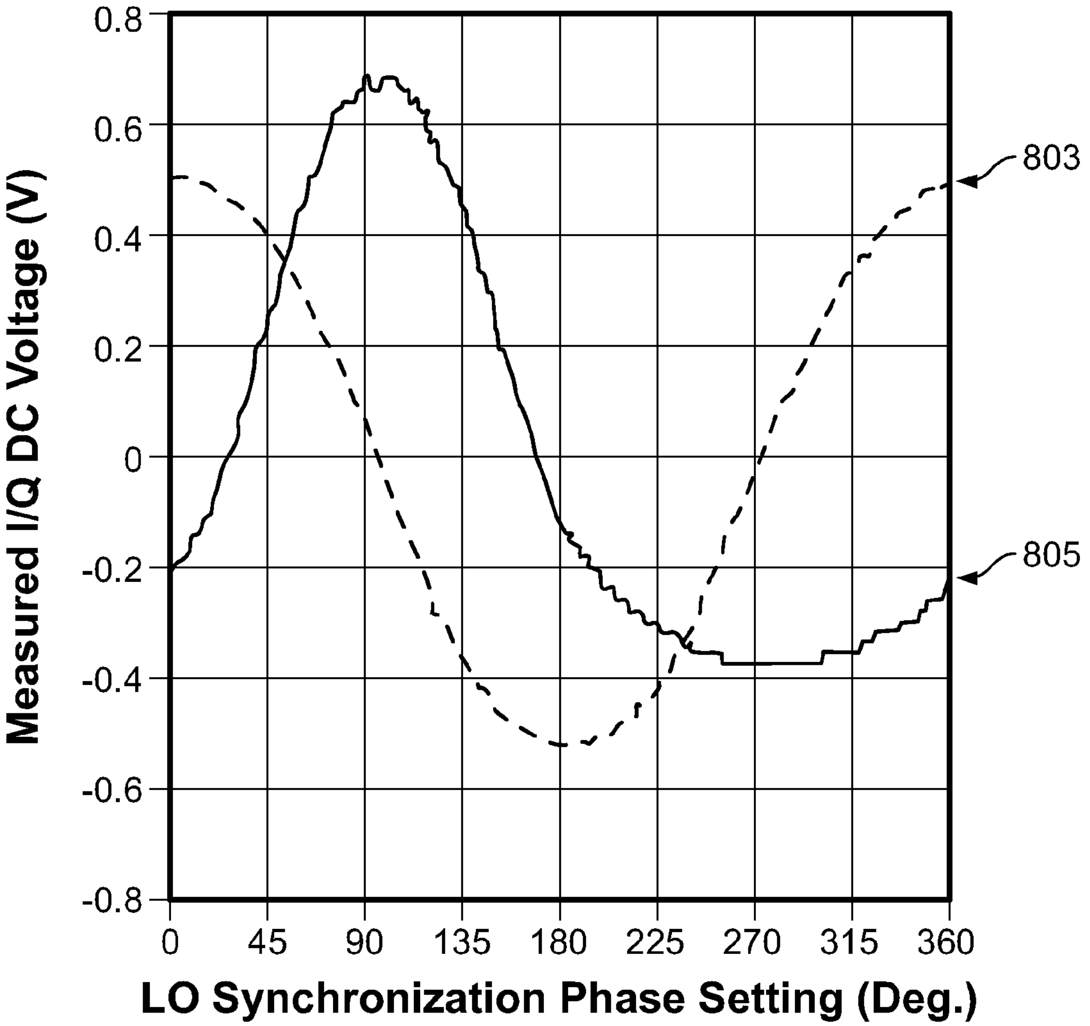
FIG. 8 shows a graphical representation of tile-to-tile phase measurements according to an embodiment.

FIG. 7 shows configuration 700 which includes a simplified schematic diagram of LO-induced DC offset-cancellation block 725 in conjunction with other similar components to those described for analog baseband block 600 (FIG. 6). For example, configuration 700 includes input from I/Q mixers 721/722 from a receiver 720 (not shown), tunable low-pass active filter 742 and a portion of a ladder attenuator VGA section 743. LO-induced DC offset-cancellation block 725 is shown to include well-known components for carrying out its traditional functions. As noted previously for various embodiments, the "leaked" LO signal can be generated by applying a DC offset to the transmit mixer on one tile and the induced DC offset at the receiver in the adjacent tile is measured by LO-induced DC offset-cancellation block 725. The DC values for the received I/Q signals, e.g., 505 for $I_{out}$ and 503 for $Q_{out}$ (from FIG. 5), are measured and processed internally, via on-chip analog-to-digital converters (ADC), e.g., ADC 726. More specifically, digitized I/Q DC signals are measured to derive the relative phase differences of the LO signals in adjacent tiles to carry out tile-to-tile self-alignment. FIG. 8 shows a graphical representation of measured DC voltages for the I/Q signals (shown as plot lines 803 and 805), obtained as a result of sweeping the phase of the LO signal from 0 to 360 degrees.

Calculating relative phase and applying phase correction parameters can be carried out in a number of different ways and are contemplated by the teachings herein. In one embodiment, as described, each RFIC measures its own DC offset value, which can be used to calculate the relative phase. The DC offset value (which is initially analog) is converted to digital (e.g., via an on-chip ADC in one embodiment, such as ADC 726 in FIG. 7) and can then be read via the digital interface of each RFIC. A central microprocessor, FPGA, or the like can then collect this data from all RFICs and compute the necessary phase information for all RFICs in the phased array system. It should be noted, and which will be apparent to those skilled in the art, the analog to digital conversion does not necessarily have to be performed on-chip in each RFIC. In one example, a central ADC can be used to perform this task outside of each RFIC. In another example, a modem can be used for calculating the relative phase and applying phase correction parameters. Other implementation schemes will be apparent to those skilled in the art, with the main consideration for any of the alternatives being that the signals and/or data must be collected between pairs of RFICs in order to calculate their relative phases and the like.

As noted in the foregoing description, the multi-tile, self-alignment process is autonomous in that it does not require or involve any external equipment or components, but rather signal alignment can be achieved across the many tiles of a phased array by utilizing components and associated signal processing that is organic to the tiles of the phased array. The autonomous, self-aligning aspects of the described embodiments can be particularly beneficial for large-scale systems, such as those that are and will be contemplated for use in next generation 5G networks.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A method for aligning signals in a phased array antenna system, the phased array antenna system including a plurality of tiles, wherein each tile from the plurality of tiles comprises at least one transmitter and at least one receiver of radio frequency signals, the method comprising: generating a first local oscillator signal at a first tile of the plurality of tiles and a second local oscillator signal at a second tile of the plurality of tiles; transmitting the first local oscillator signal, via a first transmit antenna corresponding to the first tile, to a first receive antenna corresponding to the second tile; transmitting the second local oscillator signal, via a second transmit antenna corresponding to the second tile, to a second receive antenna corresponding to the first tile; measuring a phase of the first local oscillator signal at the second tile and a phase of the second local oscillator signal at the first tile; and sweeping the phase of the first local oscillator signal from the first tile, with a first phase shifter coupled to a first local oscillator circuit, to generate a plurality of phase measurements at the second tile, wherein a linear approximation is made to the plurality of phase measurements at the second tile to form a first phase linear plot line; and determining a phase difference based on the first phase linear plot line and the measured phase of second local oscillator signal, wherein the first tile is adjacent to the second tile, wherein the first transmit antenna is electrically coupled to the first receive antenna, and wherein the second transmit antenna is electrically coupled to the second receive antenna.

2. The method of claim 1, further comprising:

adjusting the phase of one of the first local oscillator signal at the second tile and the second local oscillator signal at the first tile by an amount corresponding to the phase difference.

3. The method of claim 1, wherein the step of determining the phase difference is performed at a time corresponding to system startup for the phased array antenna system.

4. The method of claim 1, wherein measuring the phase of the first local oscillator signal at the second tile and the phase of the second local oscillator signal at the first tile further comprises:

sweeping the phase of the second local oscillator signal from the second tile to generate a plurality of phase measurements at the first tile.

5. The method of claim 4, wherein the sweeping the phase of the first local oscillator signal and the sweeping the phase of the second local oscillator signal comprises sweeping phase from 0 to 360 degrees.

6. The method of claim 1, wherein the first local oscillator signal is internally generated at the first tile and the second local oscillator signal is internally generated at the second tile.

7. The method of claim 6, further comprising:

mixing the first local oscillator signal with a first signal having a constant DC voltage value to generate a first local oscillator-induced DC offset signal; and mixing the second local oscillator signal with a second signal having a constant DC voltage value to generate a second local oscillator-induced DC offset signal.

8. The method of claim 7, wherein the measuring the phase of the first local oscillator signal at the second tile and the measuring the phase of the second local oscillator signal at the first tile is performed using digitized terms associated with a DC offset cancellation function.

9. A system for aligning signals in a phased array antenna system, the phased array antenna system including at least a first tile and a second tile positioned adjacent to the first tile, wherein the first tile and the second tile each comprise at least one transmitter and at least one receiver of radio frequency signals, the system comprising: a first local oscillator circuit configured to generate a first local oscillator signal at the first tile; a second local oscillator circuit configured to generate a second local oscillator signal at the second tile; a first transmit antenna, corresponding to the first tile, configured to transmit the first local oscillator signal to a first receive antenna corresponding to the second tile, the first transmit antenna being electrically coupled to the first receive antenna; a second transmit antenna, corresponding to the second tile, configured to transmit the second local oscillator signal to a second receive antenna corresponding to the first tile, the second transmit antenna being electrically coupled to the second receive antenna; a first baseband circuit, corresponding to the first tile, configured to measure a phase of the second local oscillator signal; a second baseband circuit, corresponding to the second tile, configured to measure a phase of the first local oscillator signal; a first phase shifter coupled to the first local oscillator circuit and configured to sweep the phase of the first local oscillator signal from the first tile to generate a plurality of phase measurements at the second tile, wherein a linear approximation is made to the plurality of phase measurements at the second tile to form a first phase linear plot line; and a processor configured to calculate a phase difference based on the first phase linear plot line and the measured phase of the second local oscillator signal.

10. The system of claim 9, wherein the processor is further configured to communicate with the first local oscillator circuit and the second local oscillator circuit to effect an adjustment of the phase of one of the first local oscillator signal and the second local oscillator signal by an amount corresponding to the phase difference.

11. The system of claim 9, wherein the processor is configured to calculate the phase difference at a time corresponding to system startup for the phased array antenna system.

12. The system of claim 9, further comprising:

a second phase shifter coupled to the second local oscillator circuit and configured to sweep the phase of the second local oscillator signal from the second tile to generate a plurality of phase measurements at the first tile.

13. The system of claim 9, wherein the first local oscillator signal is internally generated within the first tile and the second local oscillator signal is internally generated within the second tile, and wherein:

the first baseband circuit further comprises a first switch for selectively generating the first local oscillator signal; and the second baseband circuit further comprises a second switch for selectively generating the second local oscillator signal.

14. The system of claim 13, wherein:

the first baseband circuit further comprises a first mixer configured to mix the first local oscillator signal with a first signal having a constant DC voltage value to generate a first local oscillator-induced DC offset signal; and the second baseband circuit further comprises a second mixer configured to mix the second local oscillator signal with a second signal having a constant DC voltage value to generate a second local oscillator-induced DC offset signal.

15. The system of claim 14, wherein:

the first baseband circuit further comprises a first DC offset-cancellation circuit configured to measure the phase of the second local oscillator signal; and the second baseband circuit further comprises a second DC offset-cancellation circuit configured to measure the phase of the first local oscillator signal.

16. A system for performing alignment in a phased array antenna configuration, wherein the phased array antenna configuration includes at least a first tile and a second tile positioned adjacent to the first tile, wherein the first tile and the second tile each comprise at least one transmitter and at least one receiver of radio frequency signals, the system comprising a processor, for executing computer program instructions stored in a memory, which when executed by the processor, cause the system to perform operations comprising: setting a value for at least one baseband signal input associated with a first transmitter in the first tile, the value being a constant DC voltage value; mixing the at least one baseband signal input associated with the first transmitter with a first local oscillator signal to generate a first local oscillator-induced DC offset signal for up-conversion and transmission to the second tile by the first transmitter; down-converting a signal transmitted from the first transmitter to generate one or more DC voltage values in a baseband block of the second tile; sweeping the phase of the first local oscillator signal from the first tile, with a first phase shifter coupled to a first local oscillator circuit, to generate a plurality of phase measurements at the second tile, wherein a linear approximation is made to the plurality of phase measurements at the second tile to form a first phase linear plot line; calculating a phase difference based on the first phase linear plot line and a measured phase of the second local oscillator signal; and calculating phase of the first local oscillator signal as a function of the one or more DC voltage values associated with one or more baseband signal outputs, at the second tile, derived from a DC offset cancellation function.

17. The system of claim 16, wherein the operations further comprise:

setting a value for at least one baseband signal input associated with a second transmitter in the second tile, the value for the at least one baseband signal input associated with the second transmitter in the second tile being a constant DC voltage value;

mixing the at least one baseband signal input associated with the second transmitter with a second local oscillator signal to generate a second local oscillator-induced DC offset signal for up-conversion and transmission to the first tile by the second transmitter;

down-converting the second local oscillator-induced DC offset signal transmitted from the second transmitter to generate one or more DC voltage values in a baseband block of the first tile; and calculating phase of the second local oscillator-induced DC offset signal as a function of the one or more DC voltage values associated with one or more baseband signal outputs, at the first tile, derived from a DC offset cancellation function.

* * * * *